(12) United States Patent
Ellis-Monaghan et al.

(10) Patent No.: US 9,606,291 B2
(45) Date of Patent: Mar. 28, 2017

(54) MULTILEVEL WAVEGUIDE STRUCTURE

(71) Applicant: International Business Machines Corporation, Armonk, NY (US)

(72) Inventors: John J. Ellis-Monaghan, Grand Isle, VT (US); Brendan S. Harris, Burlington, VT (US); Vibhor Jain, Essex Junction, VT (US); Yves T. Ngu, Essex Junction, VT (US); Sebastian T. Ventrone, South Burlington, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 14/749,907

(22) Filed: Jun. 25, 2015

(65) Prior Publication Data
US 2016/0377806 A1  Dec. 29, 2016

(51) Int. Cl.
G02B 6/12 (2006.01)
G02B 6/125 (2006.01)
G02B 6/122 (2006.01)
G02B 6/13 (2006.01)

(52) U.S. Cl.
CPC ......... *G02B 6/125* (2013.01); *G02B 6/12002* (2013.01); *G02B 6/1228* (2013.01); *G02B 6/13* (2013.01); *G02B 2006/12061* (2013.01); *G02B 2006/12147* (2013.01); *G02B 2006/12195* (2013.01)

(58) Field of Classification Search
CPC .. G02B 6/125; G02B 6/12002; G02B 6/1228; G02B 6/13
USPC .............................................. 385/14; 438/31
See application file for complete search history.

(56) References Cited

U.S. PATENT DOCUMENTS

| | | | |
|---|---|---|---|
| 5,859,941 A | * | 1/1999 | Horita ................ G02B 6/12007 385/10 |
| 6,411,752 B1 | | 6/2002 | Little et al. |
| 7,781,800 B2 | | 8/2010 | Chen et al. |
| 8,189,968 B2 | | 5/2012 | Chen et al. |
| 8,213,751 B1 | | 7/2012 | Ho et al. |
| 8,525,264 B1 | | 9/2013 | Assefa et al. |

(Continued)

OTHER PUBLICATIONS

Xu et al., "Adiabatic Coupling Between Conventional Dielectric Waveguides and Waveguides with Discrete Translational Symmetry", Optics Letters, May 15, 2000, vol. 25, No. 10, pp. 755-757.

(Continued)

*Primary Examiner* — Jerry Blevins
(74) *Attorney, Agent, or Firm* — Gibb & Riley, LLC; Michael J. Lestrange, Esq.

(57) ABSTRACT

Integrated optical structures include a first wafer layer, a first insulator layer directly connected to the top of the first wafer layer, a second wafer layer directly connected to the top of the first insulator layer, a second insulator layer directly connected to the top of the second wafer layer, and a third wafer layer directly connected to the top of the second insulator layer. Such structures include: a first optical waveguide positioned within the second wafer layer; an optical coupler positioned within the second wafer layer, the second insulator layer, and the third wafer layer; and a second optical waveguide positioned within the third wafer layer. The optical coupler transmits an optical beam from the first optical waveguide to the second optical waveguide through the second insulator layer.

13 Claims, 16 Drawing Sheets

(56) References Cited

U.S. PATENT DOCUMENTS

| | | | |
|---|---|---|---|
| 2007/0274655 A1 | 11/2007 | Keyser et al. | |
| 2009/0256187 A1* | 10/2009 | Kim | H01L 21/823487 257/314 |
| 2010/0067847 A1* | 3/2010 | Levy | G02B 6/3538 385/14 |
| 2010/0260453 A1* | 10/2010 | Block | G02B 6/12007 385/24 |
| 2011/0108943 A1 | 5/2011 | Dennard et al. | |
| 2013/0322811 A1 | 12/2013 | Meade | |

OTHER PUBLICATIONS

Lever et al., "Adiabatic Mode Coupling Between SiGe Photonic Devices and SOI Waveguides", Optics Express, vol. 20, Issue 28, pp. 29500-29506 (2012) http://dx.doi.org/10.1364/OE.20.029500.

* cited by examiner

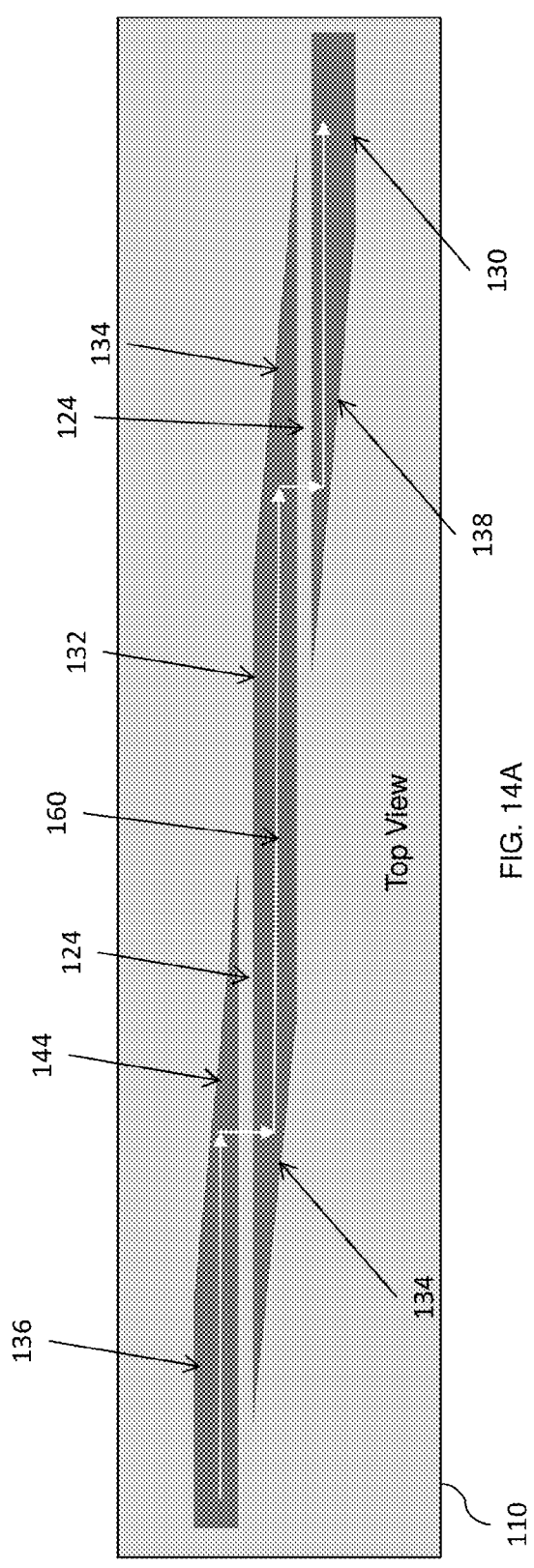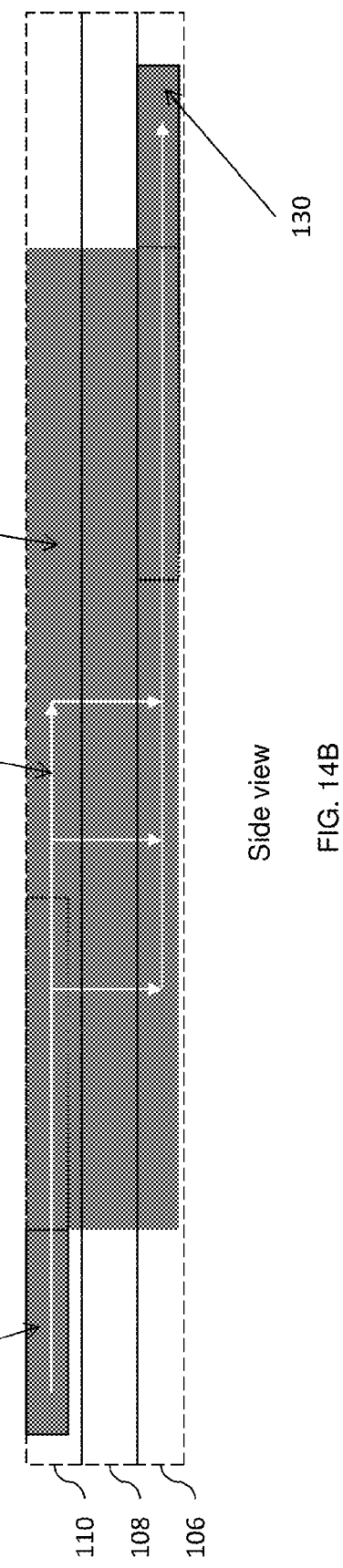
FIG. 14A Top View
FIG. 14B Side view

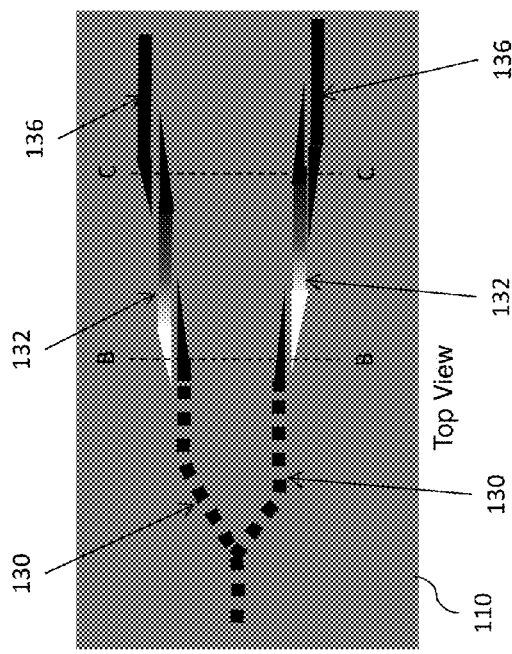
Top View
FIG. 15A
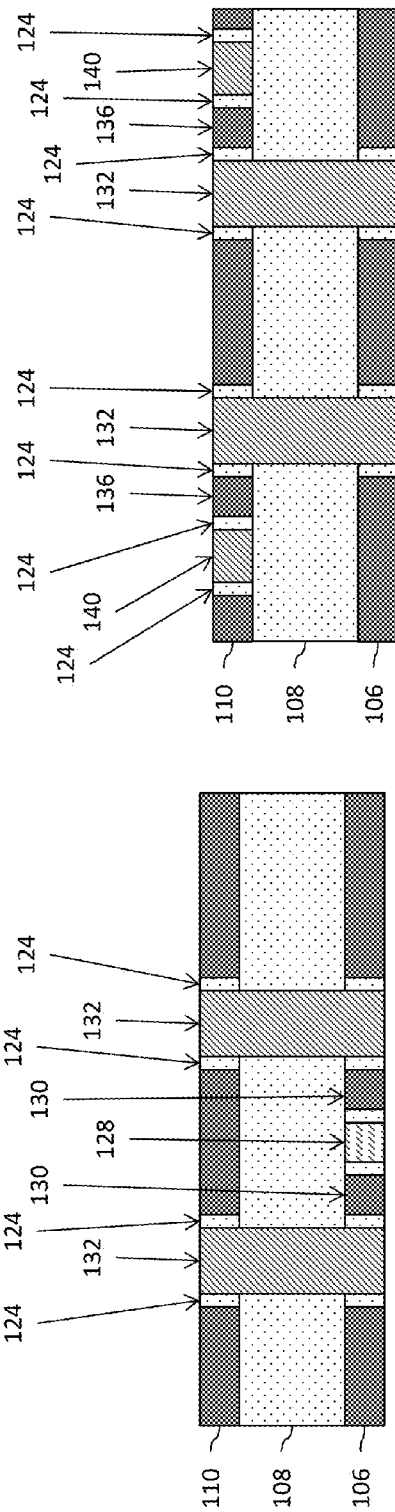
Side View C-C
FIG. 15C
Side View B-B
FIG. 15B

MULTILEVEL WAVEGUIDE STRUCTURE

BACKGROUND

The present disclosure relates to optical waveguides, and more specifically to optical waveguides in photonic integrated circuits.

A common wafer used in manufacturing integrated devices is an SOI (Silicon On Insulator) wafer. The SOI wafer has a silicon layer (SOI layer) formed on a buried oxide (insulator) film, which is commonly referred to as the BOX layer. The SOI wafer has small parasitic capacitance and high radiation resistance. The upper SOI layer, where devices are formed, is electrically and optically separated from the lower portion of the substrate by the BOX. Therefore, the SOI wafer produces high-speed and low-power consumption operation, prevents soft errors, and is regarded as a high-performance semiconductor device.

In many cases, the SOI wafers are produced by bonding methods, where a silicon oxide film is formed on the front surface of a silicon single crystal wafer, and then another silicon single crystal wafer is bonded to the oxide film on the first wafer. The bonding strength can be increased by performing bonding heat treatment. Also, one of the wafers (e.g., the SOI layer) can be thinned by mirror polishing or ion implantation to achieve desired performance and size considerations. Photonic integrated circuits (PIC) often form optical waveguides and other optical structures using the SOI layer.

SUMMARY

According to embodiments herein, some methods form an integrated optical structure by providing a first wafer layer that has a first wafer layer top. These methods form a first insulator layer on the first wafer layer top such that the first insulator layer bottom is directly connected to the first wafer layer top, and the first insulator layer top is opposite the first insulator layer bottom. Such methods bond a second wafer layer to the first insulator layer top, so that the second wafer layer bottom is directly connected to the first insulator layer top and the second wafer layer top is opposite the second wafer layer bottom.

The methods then form a first optical waveguide within the second wafer layer. Also, these methods form a second insulator layer on the second wafer layer top, so that the second insulator layer bottom is directly connected to the second wafer layer top and the second insulator layer top is opposite the second insulator layer bottom.

Further, such methods form an optical coupler within the second insulator layer, so that (in some embodiments) the second insulator is formed to be devoid of devices other than the optical coupler. These methods bond a third wafer layer to the second insulator layer top such that the third wafer layer bottom is directly connected to the second insulator layer top and so that the third wafer layer top is opposite the third wafer layer bottom. Furthermore, these methods form optical and electrical devices on the third wafer layer.

The first wafer layer, first insulator layer, second wafer layer, second insulator layer and the third wafer layer, are planar layers that are formed to lie in different parallel planes. The optical coupler directs the optical beam in a first direction perpendicular to the parallel planes, and the optical coupler directs the optical beam in second directions parallel to the parallel planes. Thus, the optical coupler (positioned in the second insulator layer) transmits the optical beam from the first optical waveguide (that is in the second wafer layer) to the second optical waveguide (that are in the third wafer layer) through the second insulator layer.

More specifically, the first optical waveguide is formed to have a first optical waveguide tapered end adjacent the optical coupler, similarly the second optical waveguide is formed to have a second optical waveguide tapered end adjacent the optical coupler, and the optical coupler is formed to have corresponding optical coupler tapered ends adjacent the first optical waveguide tapered end and the second optical waveguide tapered end. The first optical waveguide tapered end is shaped to direct the optical beam from the first optical waveguide toward the optical coupler in a direction parallel to the aforementioned parallel planes; the optical coupler tapered ends are shaped to direct the optical beam received from the first optical waveguide toward internal spaces of the optical coupler in a direction parallel to the aforementioned parallel planes, and to direct the optical beam from the internal spaces of the optical coupler toward the second optical waveguide in a direction parallel to the aforementioned parallel planes; and the second optical waveguide tapered end is shaped to direct the optical beam received from the optical coupler toward internal spaces of the second optical waveguide in a direction parallel to the aforementioned parallel planes.

Integrated optical structures herein include many components including a first wafer layer that has a first wafer layer top. In these structures, a first insulator layer has a first insulator layer bottom that is directly connected to the first wafer layer top, and the first insulator layer has a first insulator layer top opposite the first insulator layer bottom.

Additionally, with these structures, a second wafer layer has a second wafer layer bottom that is directly connected to the first insulator layer top, and the second wafer layer has a second wafer layer top that is opposite the second wafer layer bottom. Also, a second insulator layer has a second insulator layer bottom that is directly connected to the second wafer layer top, and the second insulator layer has a second insulator layer top that is opposite the second insulator layer bottom. Further, with such structures, a third wafer layer has a third wafer layer bottom that is directly connected to the second insulator layer top, and the third wafer layer has a third wafer layer top opposite the third wafer layer bottom.

With such structures, a first optical waveguide is positioned within the second wafer layer; an optical coupler is positioned within the second wafer layer, the second insulator layer, and the third wafer layer; and second optical waveguides and electrical devices are positioned in and on the third wafer layer. This optical coupler transmits an optical beam from the first optical waveguide to the second optical waveguide through the second insulator layer.

The first wafer layer, first insulator layer, second wafer layer, second insulator layer, and third wafer layer are planar layers which lie in different parallel planes. The optical coupler directs the optical beam in a first direction perpendicular to the parallel planes and the optical coupler also directs the optical beam in second directions parallel to the parallel planes.

More specifically, the first optical waveguide has a first optical waveguide tapered end adjacent the optical coupler, similarly the second optical waveguide has a second optical waveguide tapered end adjacent the optical coupler, and the optical coupler has corresponding optical coupler tapered ends adjacent the first optical waveguide tapered end and the second optical waveguide tapered end. The first optical waveguide tapered end is shaped to direct the optical beam from the first optical waveguide toward the optical coupler in a direction parallel to the aforementioned parallel planes; the optical coupler tapered ends are shaped to direct the optical beam received from the first optical waveguide toward internal spaces of the optical coupler in a direction parallel to the aforementioned parallel planes, and to direct the optical beam from the internal spaces of the optical coupler toward the second optical waveguide in a direction parallel to the aforementioned parallel planes; and the second optical waveguide tapered end is shaped to direct the optical beam received from the optical coupler toward internal spaces of the second optical waveguide in a direction parallel to the aforementioned parallel planes.

Other integrated optical structures herein include many components including a handle silicon wafer layer that has a handle silicon wafer layer top. In these structures, a first BOX layer has a first BOX layer bottom that is directly connected to the handle silicon wafer layer top, and the first BOX layer has a first BOX layer top opposite the first BOX layer bottom.

Additionally, with these structures, a first SOI layer has a first SOI layer bottom that is directly connected to the first BOX layer top, and the first SOI layer has a first SOI layer top that is opposite the first SOI layer bottom. Also, a second BOX layer has a second BOX layer bottom that is directly connected to the first SOI layer top, and the second BOX layer has a second BOX layer top that is opposite the second BOX layer bottom. Further, with such structures, a second SOI layer has a second SOI layer bottom that is directly connected to the second BOX layer top, and the second SOI layer has a second SOI layer top opposite the second SOI layer bottom.

With such structures, a first optical waveguide is positioned within the first SOI layer; an optical coupler is positioned within the first SOI layer, the second BOX layer, and the second SOI layer; and second optical waveguides and electrical devices are positioned on the second SOI layer. This optical coupler transmits an optical beam from the first optical waveguide to the second optical waveguide through the second BOX layer.

The handle silicon wafer layer, first BOX layer, first SOI layer, second BOX layer, and second SOI layer are planar layers which lie in different parallel planes. The optical coupler directs the optical beam in a first direction perpendicular to the parallel planes and the optical coupler also directs the optical beam in second directions parallel to the parallel planes.

More specifically, the first optical waveguide has a first optical waveguide tapered end adjacent the optical coupler, similarly the second optical waveguide has a second optical waveguide tapered end adjacent the optical coupler, and the optical coupler has corresponding optical coupler tapered ends adjacent the first optical waveguide tapered end and the second optical waveguide tapered end. The first optical waveguide tapered end is shaped to direct the optical beam from the first optical waveguide toward the optical coupler in a direction parallel to the aforementioned parallel planes; the optical coupler tapered ends are shaped to direct the optical beam received from the first optical waveguide toward internal spaces of the optical coupler in a direction parallel to the aforementioned parallel planes, and to direct the optical beam from the internal spaces of the optical coupler toward the second optical waveguide in a direction parallel to the aforementioned parallel planes; and the second optical waveguide tapered end is shaped to direct the optical beam received from the optical coupler toward internal spaces of the second optical waveguide in a direction parallel to the aforementioned parallel planes.

BRIEF DESCRIPTION OF THE DRAWINGS

The embodiments herein will be better understood from the following detailed description with reference to the drawings, which are not necessarily drawn to scale and in which:

FIG. 14A is a top-view schematic diagram illustrating structures herein;

FIG. 14B is a side-view schematic diagram of FIG. 14A illustrating structures herein;

FIG. 15A is a top-view schematic diagram illustrating structures herein;

FIG. 15B is a side-view schematic diagram view along line B-B in FIG. 15A illustrating structures herein;

FIG. 15C is a side-view schematic diagram view along line C-C in FIG. 15A illustrating structures herein.

DETAILED DESCRIPTION

Figure 1:
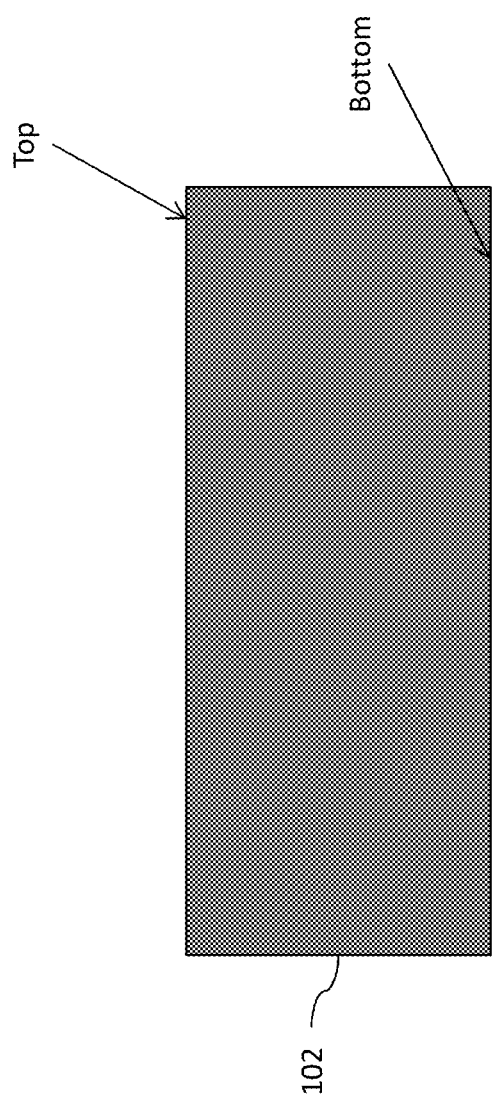
FIG. 1 is a side-view schematic diagram illustrating partially formed structures herein.

According to embodiments herein, methods herein form an integrated optical structure. As shown in FIG. 1, which is a side-view schematic diagram, such methods provide a first wafer layer (e.g., uniform single-crystal orientation silicon wafer layer, which is sometimes referred to as a "handle" wafer) 102.

Figure 2:
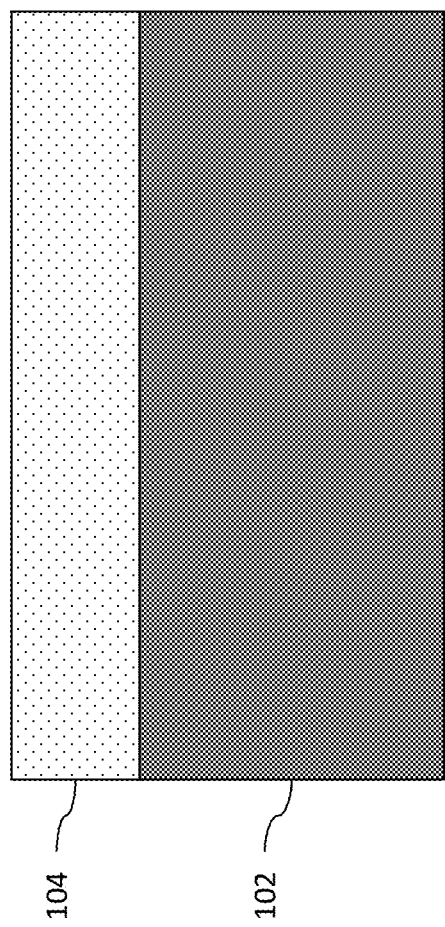
FIG. 2 is a side-view schematic diagram illustrating partially formed structures herein.

As shown in FIG. 2, these methods form a first insulator layer (e.g., a first buried oxide (BOX) layer) 104 on the arbitrarily named "top" of the first wafer layer 102 such that the "bottom" of the first insulator layer 104 is directly connected to the top of the first wafer layer 102. As in all structures herein, the arbitrarily named "top" of the first insulator layer 104 is opposite the arbitrarily named "bottom" of the first insulator layer 104, and the terms "top" and "bottom" herein are not intended to require any specific orientation, but are merely used as shorthand terms to more easily identify different sides of structures that relatively oppose one another.

The insulator layers herein can be formed by growth or deposition processes, as is understood by those ordinarily skilled in the art. In some examples, the dielectrics (insulators) mentioned herein can, for example, be grown from either a dry oxygen ambient or steam, etc. Alternatively, the insulators herein may be formed from any of the many candidate high dielectric constant (high-k) materials, including but not limited to silicon nitride, silicon oxynitride, of $SiO_2$ and $Si_3N_4$, metal oxides such as tantalum oxide, etc. The thickness of dielectrics herein may vary contingent upon the required device performance and size; however, the BOX layers herein are sufficiently thick to form an effective optical insulator (opaque light blocking layer, and are generally 2 um or more thick for optical isolation).

Figure 3:
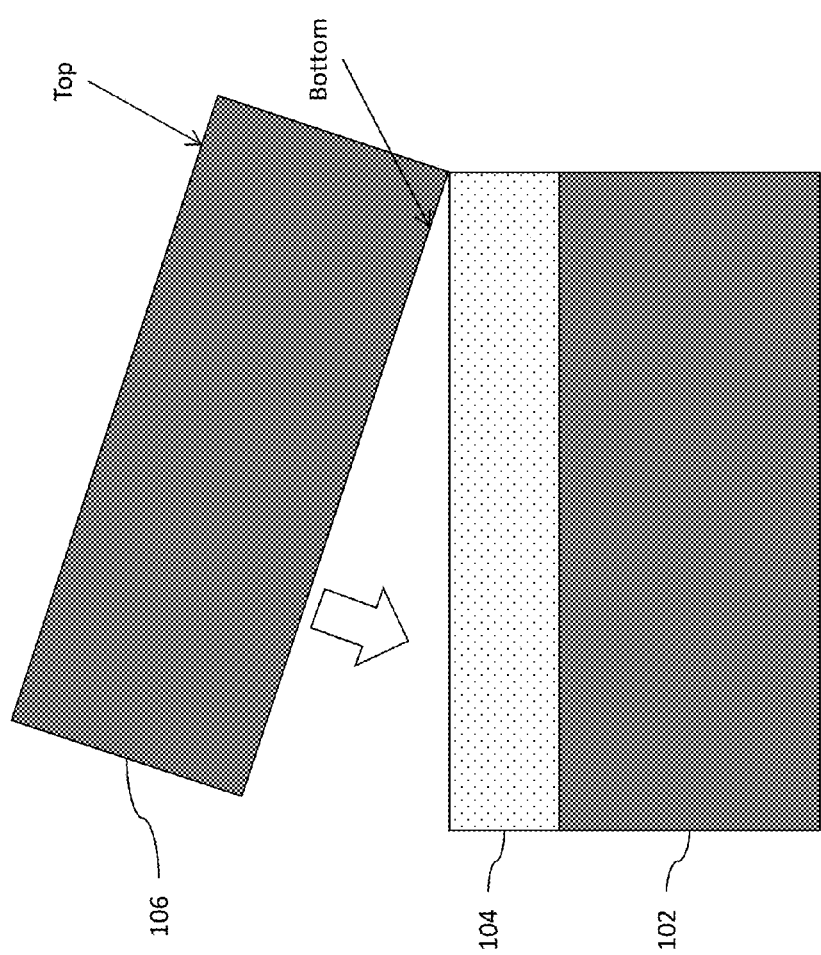
FIG. 3 is a side-view schematic diagram illustrating partially formed structures herein.

FIG. 3 illustrates that such methods bond a second wafer layer (e.g., first silicon-on-insulator (SOI) layer) 106 to the top of the first insulator layer 104, so that the bottom of the second wafer layer 106 is directly connected to the top of the first insulator layer 104 and the top of the second wafer layer 106 is opposite the bottom of the second wafer layer 106. The bonding processes used herein can include any attachment process presently known or developed in the future, and can include heating processes, using chemical adhesives, etc., as is understood by those ordinarily skilled in the art. If desired, the thickness of any layer herein can be reduced by any known or newly developed etching or polishing processes, as shown with the thinned wafer layers 106 and 110 in FIGS. 5 and 8 discussed in detail below.

Figure 4:
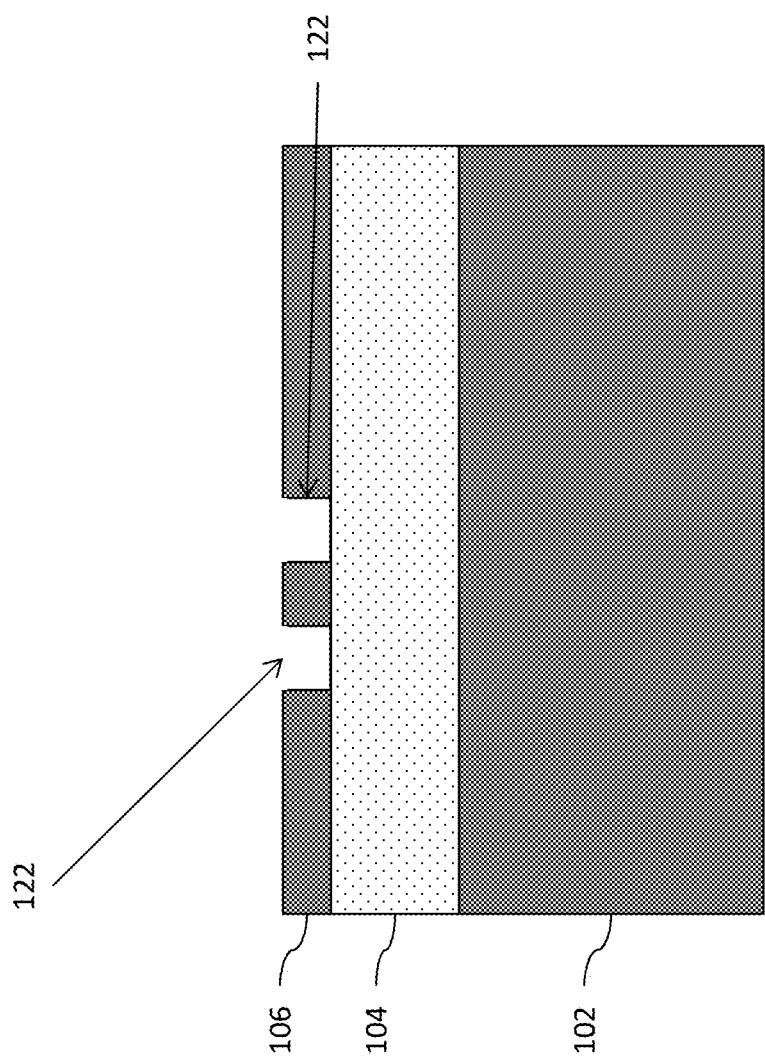
FIG. 4 is a side-view schematic diagram illustrating partially formed structures herein.

The methods then pattern openings 122, as shown in FIG. 4. While not illustrated to keep the drawings succinct, when patterning any material herein, a patterning layer (such as an organic photoresist) can be formed over the material to be patterned. The patterning layer (resist) can be exposed to some pattern of light radiation (e.g., patterned exposure, laser exposure, etc.) provided in a light exposure pattern, and then the resist is developed using a chemical agent. This process changes the physical characteristics of the portion of the resist that was exposed to the light. Then one portion of the resist can be rinsed off, leaving the other portion of the resist to act as a mask to protect the material to be patterned (which portion of the resist that is rinsed off depends upon whether the resist is a positive resist (illuminated portions remain) or negative resist (illuminated portions are rinsed off)). A material removal process is then performed (e.g., plasma etching, etc.) to remove the unprotected portions of the material below the resist to be patterned. The resist is subsequently removed to leave the underlying material patterned according to the light exposure pattern (or a negative image thereof).

Figure 5:
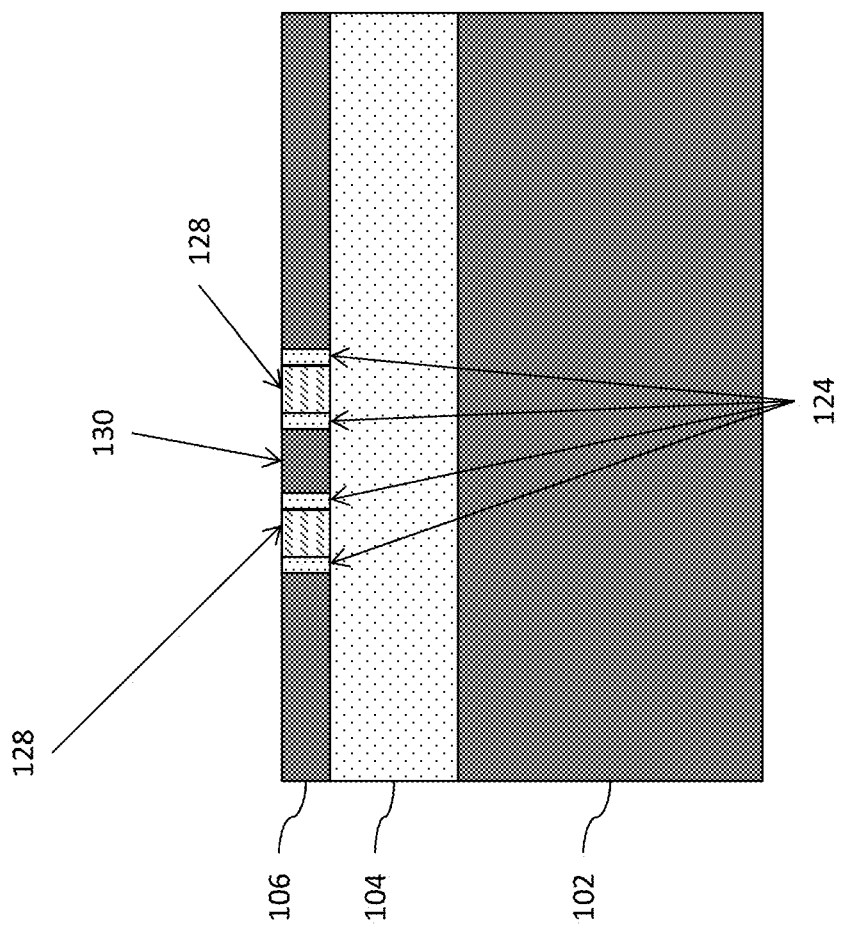
FIG. 5 is a side-view schematic diagram illustrating partially formed structures herein.

As shown in FIG. 5, an insulator (e.g., oxide) 124 and a cladding material 128 are grown or deposited in the openings 122 to form an optical waveguide 130 between the cladding material 128 (as separated by the insulator 124, which can be for example, 10 nm to 200 nm thick) within the second wafer layer 106. The characteristics of all of the cladding material, cooperate with the unaltered SOI wafer 106 so that light remains predominantly inside the waveguide 130. The cladding materials can be any known or later developed cladding materials including, for example, an oxide (such as silicon dioxide), a nitride (such as silicon nitride, where the substrate is silicon-based). Also, the cladding material can be a polymer, silicon oxynitride, sapphire, a III-V compound semiconductor, a chalcogenide, etc. While only a single waveguide 130 is shown in FIG. 5, as is understood by those ordinarily skilled in the art, SOI wafer 106 can include multiple waveguides, as shown in FIGS. 15A-15C, discussed below.

Figure 6:
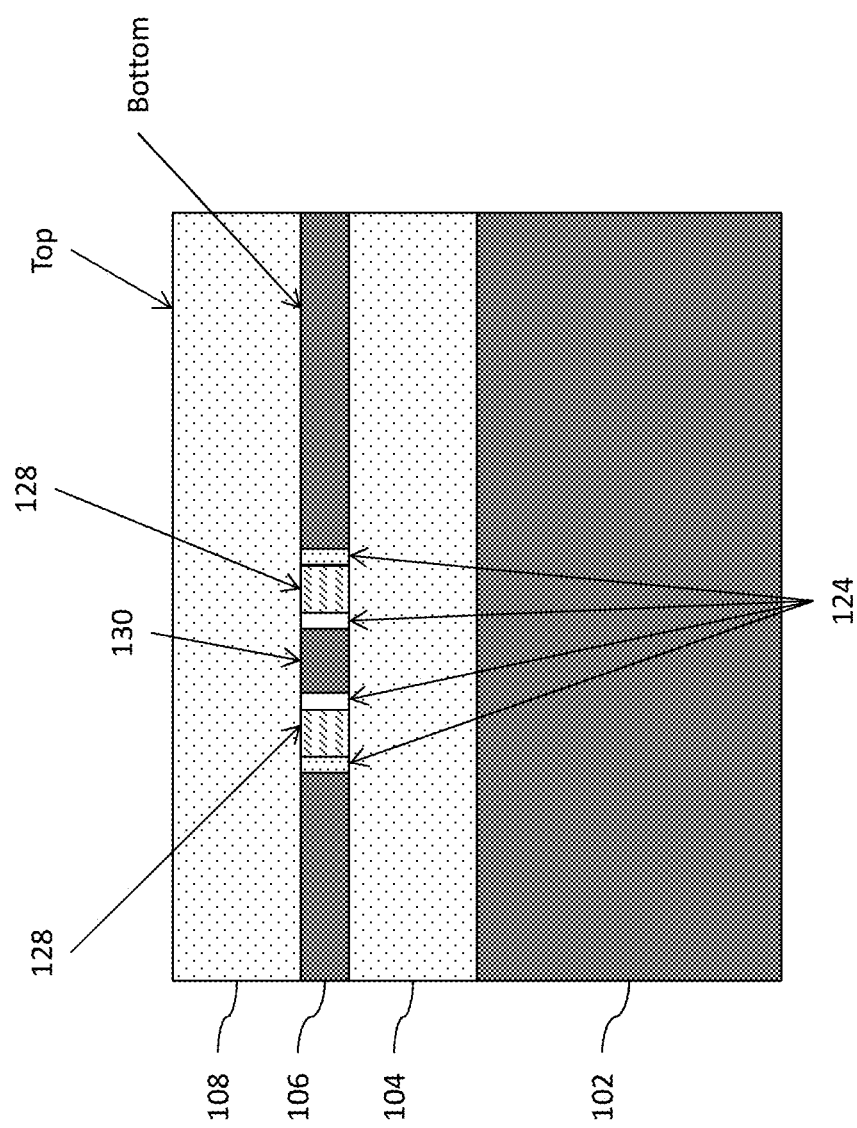
FIG. 6 is a side-view schematic diagram illustrating partially formed structures herein.

Also, as shown in FIG. 6, these methods form a second insulator layer (second BOX layer) 108 on the top of the second wafer layer 106, so that the bottom of the second insulator layer 108 is directly connected to the top of the second wafer layer 106 (using any of the processes discussed above). Again, the "top" of the second insulator layer 108 is opposite the "bottom" of the second insulator layer 108.

Figure 7:
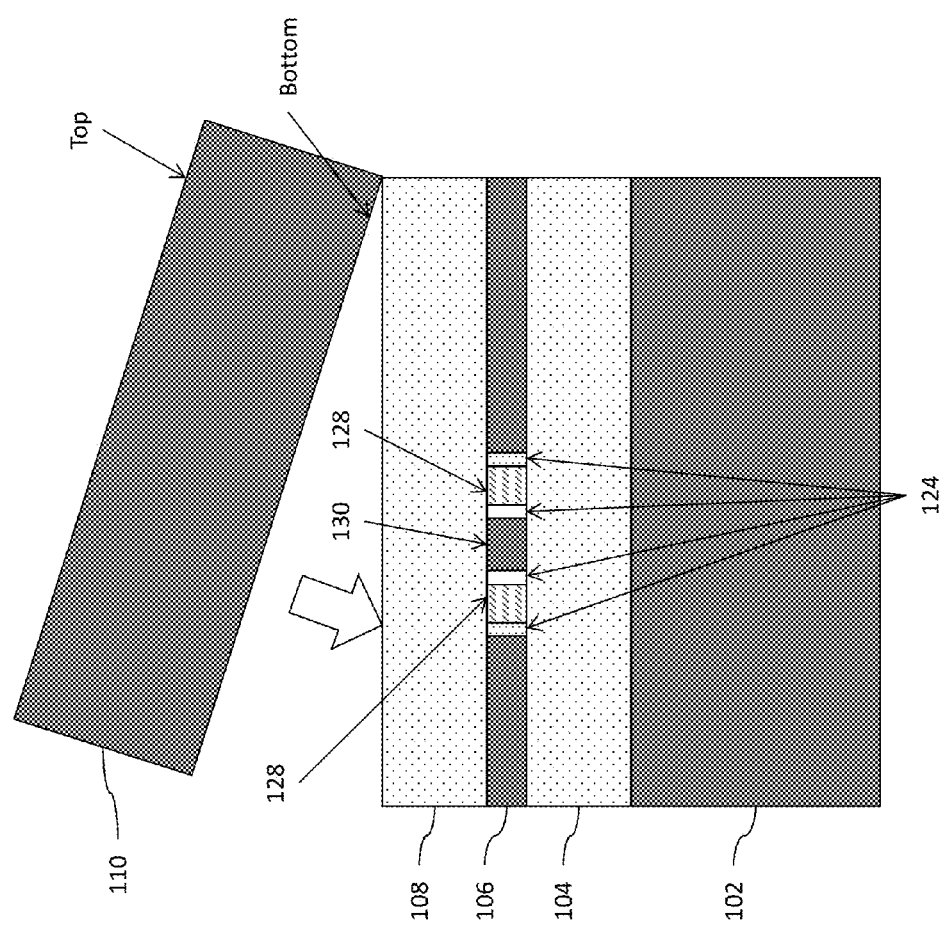
FIG. 7 is a side-view schematic diagram illustrating partially formed structures herein.

Further, as shown in FIG. 7, these methods bond a third wafer layer (e.g., second SOI layer) 110 to the top of the second insulator layer 108 such that the bottom of the third wafer layer 110 is directly connected to the top of the second insulator layer 108 and so that the top of the third wafer layer 110 is opposite the bottom of the third wafer layer 110.

As with wafer layer 106, wafer layer 110 can be similarly thinned, using the processing discussed above, as shown in FIG. 8. As also shown in FIG. 8, such methods pattern additional openings 126 (using the processing discussed above) into and/or through the third wafer layer 110, the second insulator layer 108, and the second wafer layer 106, and form insulators 124.

Figure 9:
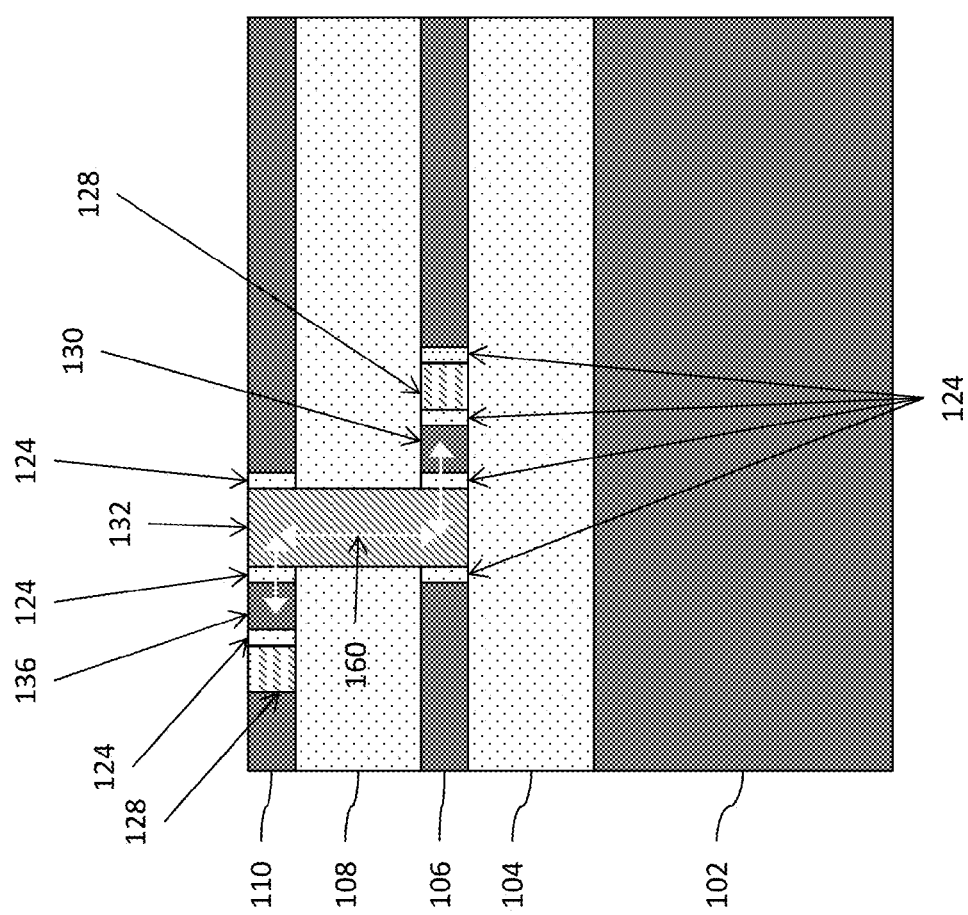
FIG. 9 is a side-view schematic diagram illustrating partially formed structures herein.

As shown in FIG. 9, the methods herein form, deposit, or insert a previously created optical coupler 132 within one of the openings 126. Further, using similar processing to that discussed above, the methods herein grow or deposit cladding material 128 in one of the openings 126 to define an optical waveguide 136 between the cladding material 128 and the optical coupler 132 within the third wafer layer 110. Again, the characteristics of the cladding material 128 cooperates with the unaltered SOI wafer 110 so that light remains predominantly inside the waveguide 136. While only a single optical coupler 132 is shown in FIG. 9, as is understood by those ordinarily skilled in the art, these structures can include multiple optical couplers 132, as shown in FIGS. 15A-15C, discussed below.

To form any optical coupler 132 herein, a material capable of transmitting light is formed in any previously formed opening (or the optical device is manufactured separately and attached to any of the layers of the structure) and the surrounding layer acts as a reflector/refractor to keep the light within the optical coupler 132. Some exemplary materials that can be used to form optical coupling devices herein include the SOI layer itself, silica ($SiO_2$) on silicon, various polymers and compound semiconductor materials such as GaAs, InP, and GaN, monocrystalline silicon, polycrystalline silicon, amorphous silicon (a-Si), silicon nitride ($SiN_x$), e.g., $Si_3N_4$, silicon oxy nitride (SiON), germanium, III-V compound semiconductors, II-VI compound semiconductors, IV-VI compound semiconductors, a chalcogenide such as arsenic selenide ($As_2Se_3$) or arsenic sulphide ($As_2S_3$) and germanium antimony sulphide (GeSbS), etc. These materials are generally capable of transmitting optical beams having wavelengths ranging from the UV/visible spectrum (200-750 nm) to near Infrared spectrum (750 nm-1650 nm).

Figure 8:
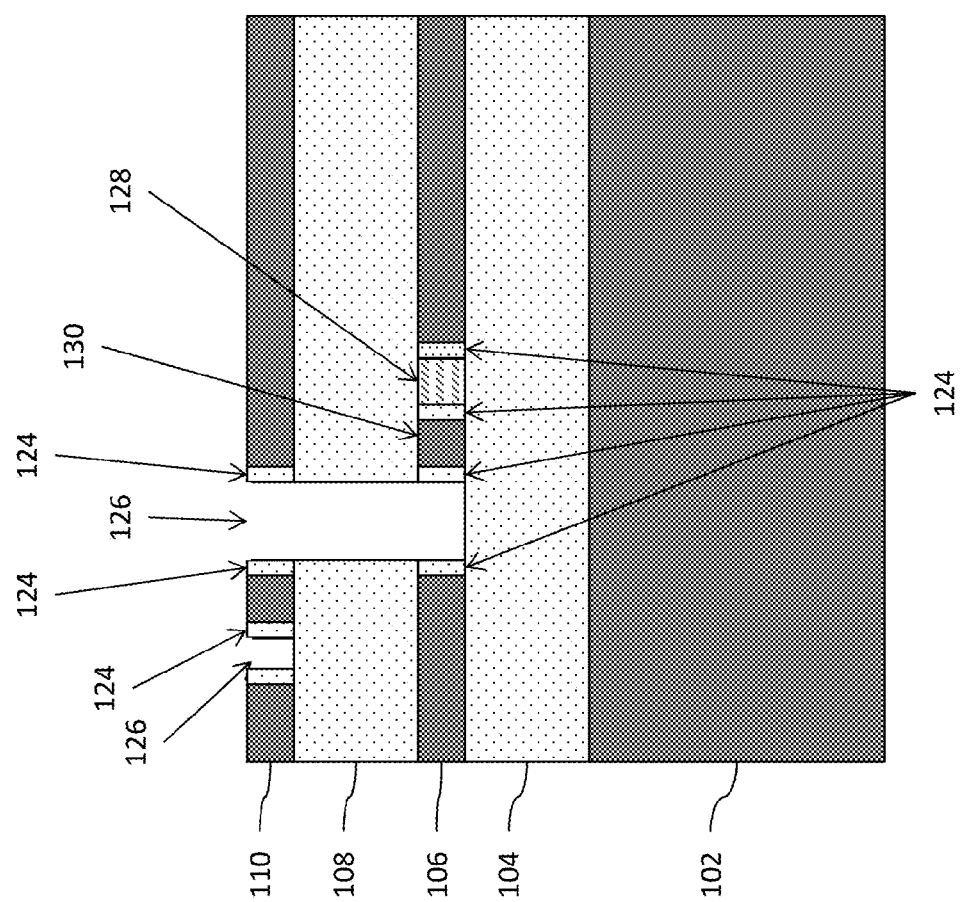
FIG. 8 is a side-view schematic diagram illustrating partially formed structures herein.

As shown in FIGS. 4 and 8, the various openings 122 and 126 are patterned to position the waveguides 130 and 132, and the optical coupler 132 directly next to one another (without any intervening materials other than the insulators 124) to allow each device to transmit and receive light to and from the other. Further, the optical coupler 132 is formed to extend through the second wafer layer 106, the second insulator layer 108, and the third wafer layer 110 to transmit light between the different waveguides 130 and 136 (where light waves (or light beams) are shown with white arrow 160 in the drawings).

Figure 10:
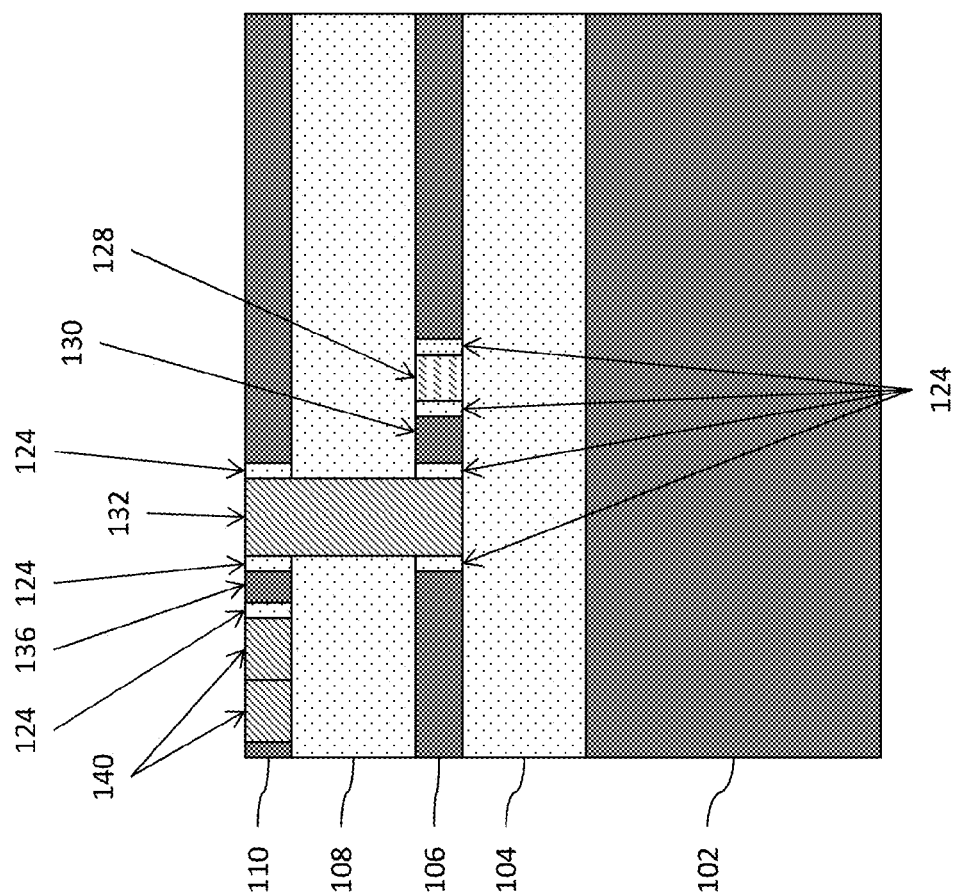
FIG. 10 is a side-view schematic diagram illustrating partially formed structures herein.
Figure 11:
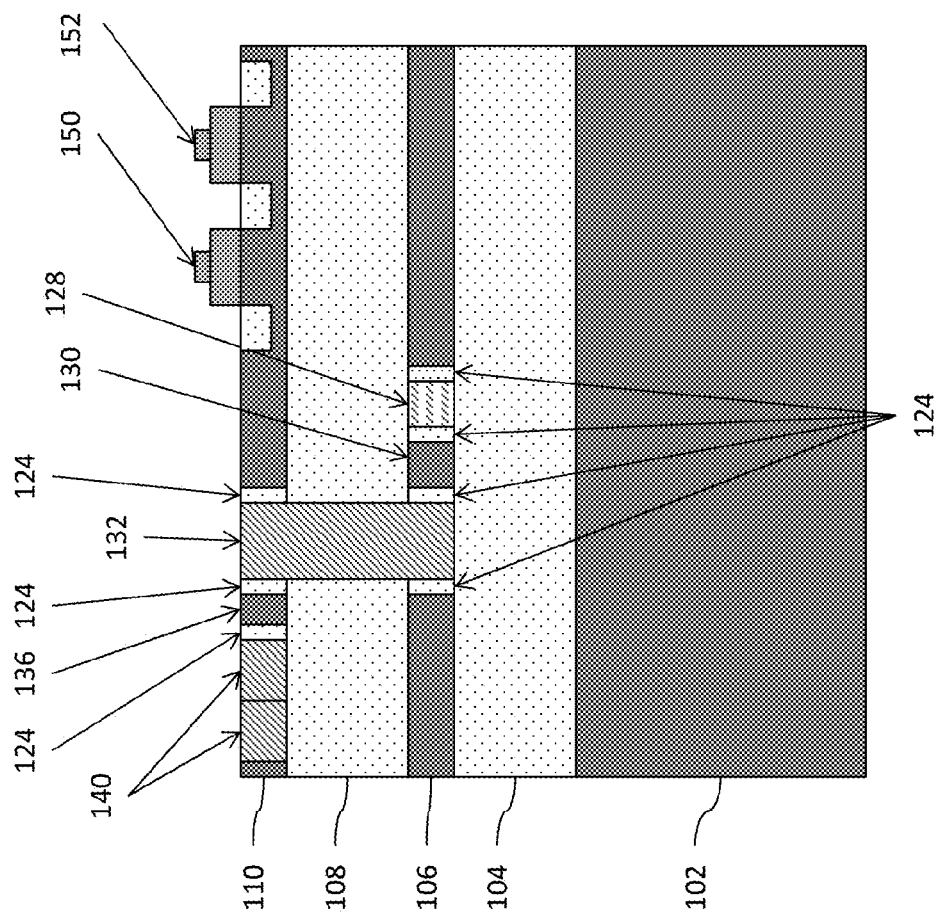
FIG. 11 is a side-view schematic diagram illustrating structures herein.

Furthermore, as shown in FIG. 10, these methods form optical devices 140 in the third wafer layer 110 (through growth, deposition, attachment of previously manufactured optical devices, etc. (and the details of the formation of such devices are not illustrated for conciseness)). Similarly, as shown in FIG. 11, electrical devices 150, 152 are formed on and/or in the top of the third wafer layer 110 (through growth, deposition, attachment of previously manufactured optical devices, etc. (and again the details of the formation of such devices are not illustrated for conciseness)).

As is understood by those ordinarily skilled in the art, such optical devices 140 can include, but are not limited to passive devices (such as optical beam splitters, optical wavelength filters, optical resonators, optical waveguides, optical wavelength multiplexers, optical couplers, optical polarizers, optical isolators, polarization rotators, etc.), emissive devices (such as optical amplifiers, lasers, light-emitting devices, etc.), absorptive devices (such as photo-detectors, etc.), electro-optic devices (such as electro-optic modulators, electro-optic phase shifters, electro-optic switches, etc.), and nonlinear-optical devices (such as second harmonic generators, photonic transistor, and all-optical switches etc.). Similarly, such electronic devices 150, 152 can include, but are not limited to conductors, insulators, transistors, diodes, resistors, capacitors, inductors, etc. Methods for manufacturing such devices are well known to those ordinarily skilled in the art, and are not discussed in detail herein to keep focus on the salient features of the disclosed structures and methods herein.

Generally, transistor structures (e.g., 150, 152) are formed by depositing or implanting impurities into a substrate to form at least one semiconductor channel region, bordered by shallow trench isolation regions below the top (upper) surface of the substrate. A "substrate" or wafer herein can comprise any material appropriate for the given purpose (whether now known or developed in the future) and can comprise, for example, Si, SiC, SiGe, SiGeC, other III-V or II-VI compound semiconductors, or organic semiconductor structures, etc. The "shallow trench isolation" (STI) structures are well-known to those ordinarily skilled in the art and are generally formed by patterning openings/trenches within the substrate and growing or filling the openings with a highly insulating material (this allows different active areas of the substrate to be electrically isolated from one another).

As also shown in FIG. 11, the first wafer layer 102, first insulator layer 104, second wafer layer 106, second insulator layer 108 and the third wafer layer 110, are planar layers that are formed to lie in different parallel planes. The optical coupler 132 directs the optical beam in a first direction perpendicular to the parallel planes, and the optical coupler 132 directs the optical beam in second directions parallel to the parallel planes (see the discussion of FIGS. 14A-14B below). Thus, the optical coupler 132 (positioned in the second wafer layer 106, second insulator layer 108, and the third wafer layer 110) and the second waveguide 136 transmit the optical beam from the optical waveguide 130 (that is in the second wafer layer 106) to the optical devices 140 (that are in the third wafer layer 110) through the second insulator layer 108 and the third wafer layer 110.

Thus, as shown in FIG. 11, integrated optical structures herein include many components including a handle silicon wafer layer 102. In these structures, a first BOX layer 104 has a bottom that is directly connected to the top of the handle silicon wafer layer 102, and the first BOX layer 104 has a top opposite the bottom of the first BOX layer 104 bottom. Additionally, with these structures, a first SOI layer 106 has a bottom that is directly connected to the top of the first BOX layer 104, and the first SOI layer 106 has a top that is opposite the bottom of the first SOI layer 106. Also, a second BOX layer 108 has a bottom that is directly connected to the top of the first SOI layer 106, and the second BOX layer 108 has a top that is opposite the bottom of the second BOX layer 108. Further, with such structures, a second SOI layer 110 has a bottom that is directly connected to the top of the second BOX layer 108, and the second SOI layer 110 has a top opposite the bottom of the second SOI layer 110.

With such structures, a first optical waveguide 130 is positioned within the first SOI layer 106; an optical coupler 132 is positioned within the first SOI layer 106, the second BOX layer 108, and the second SOI layer 110; a second optical waveguide 136 is positioned within the second SOI layer 110; and optical devices 140 and electrical devices 150, 152 are positioned in and on the second SOI layer 110. This optical coupler 132 transmits an optical beam from the optical waveguide 130 to the second optical waveguide 136 through the second BOX layer 108.

As shown in FIG. 11, the handle silicon wafer layer 102, first BOX layer 104, first SOI layer 106, second BOX layer 108, and second SOI layer 110 are planar layers that lie in different parallel planes. The optical coupler 132 directs the optical beam in a first direction perpendicular to the parallel planes and the optical coupler 132 also directs the optical beam in second directions parallel to the parallel planes. Additionally, the handle silicon wafer 102 is devoid of any devices, and the handle silicon wafer 102 consists of only single-crystal silicon.

Figure 12:
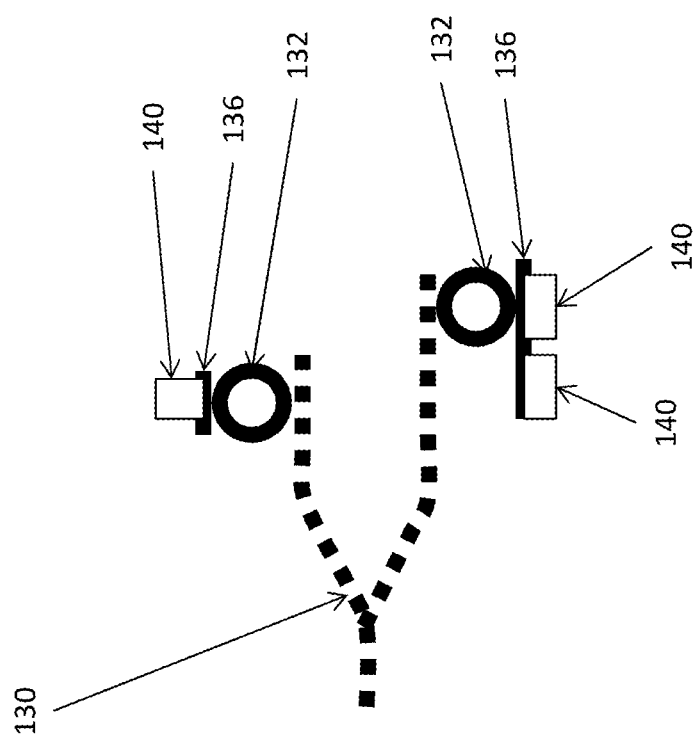
FIG. 12 is a top-view schematic diagram illustrating structures herein.
Figure 13:
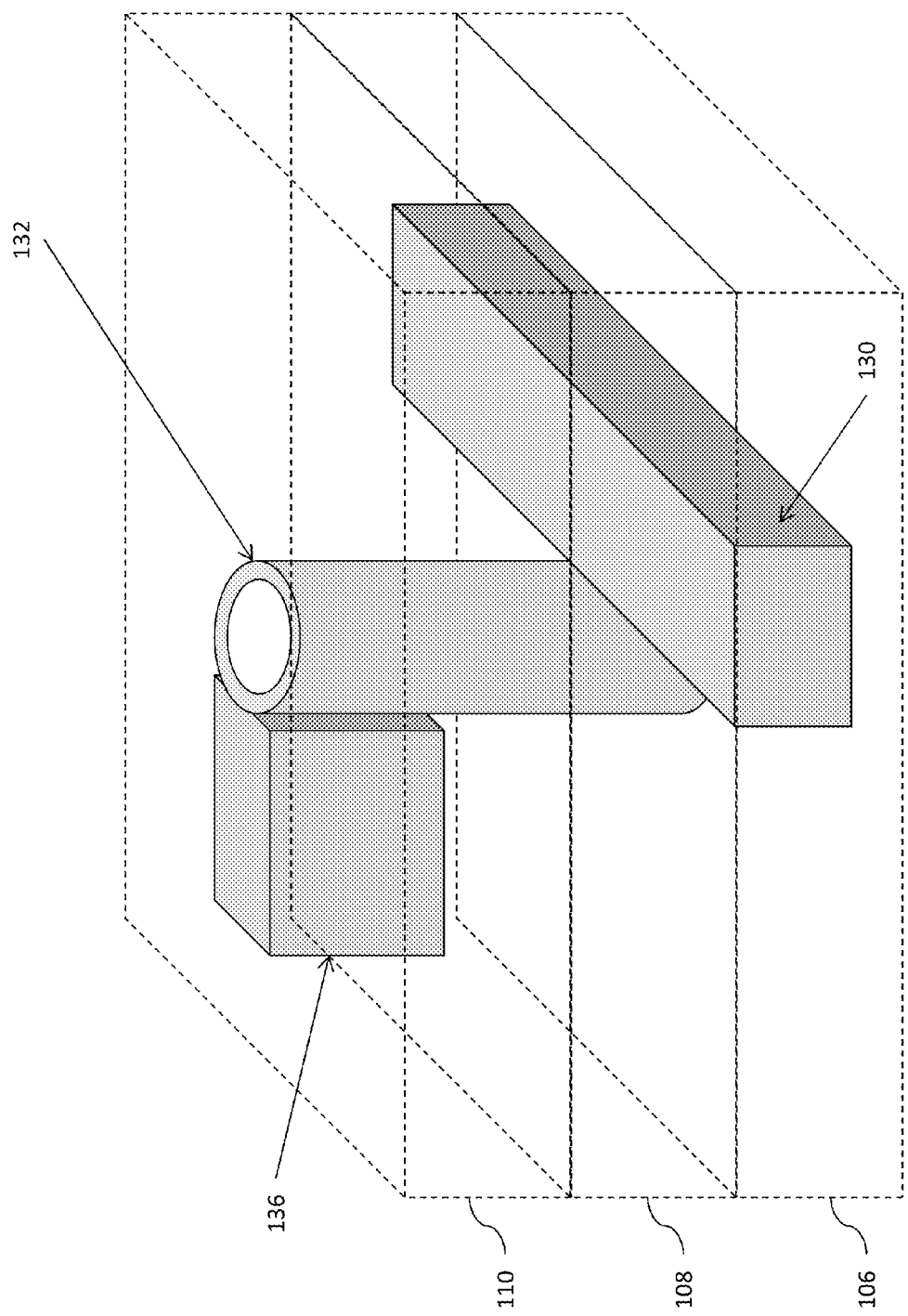
FIG. 13 is a perspective-view schematic diagram illustrating structures herein.

FIG. 12 is a top-view schematic diagram and FIG. 13 is a perspective-view schematic diagram, both illustrating structures herein and such figures illustrate that the optical coupler 132 can be a vertical ring coupler positioned within the first SOI layer 106, the second BOX layer 108, and the second SOI layer 110. The optical signal (or light) can be moved from buried waveguide 130 to top silicon layer 110 and vice-versa using vertical ring couplers 132. In FIG. 12, the dash lines represent the buried waveguides 130. Items 132 are the ring couplers in space from the bottom to top silicon layers, though the top BOX. The solid lines (items 136) represent devices or waveguides in the top silicon layer 110.

FIG. 14A is a top-view schematic diagram and FIG. 14B is a side-view schematic diagram, both illustrating the optical coupler in the form of a uniquely designed vertical adiabatic coupler 132. The white line (item 160) in FIGS. 14A-14B depicts the light path through the device from top 110 to bottom 102, or vice versa.

As noted above, the handle silicon wafer layer 102, first BOX layer 104, first SOI layer 106, second BOX layer 108, and second SOI layer 110 are planar layers which lie in different parallel planes, and as shown in FIGS. 14A-14B, the optical coupler 132 directs the optical beam in a first direction perpendicular to the parallel planes and the optical coupler 132 also directs the optical beam in second directions parallel to the parallel planes. In other words, the optical coupler shown in FIGS. 14A-14B directs the light beam in two different directions that are perpendicular to one another and therefore transmits the light beam both up through the device, and across the device.

More specifically, in FIGS. 14A-14B the first optical waveguide 130 is formed to have a first optical waveguide tapered end 138 adjacent the optical coupler 132. Similarly the second optical waveguide 136 is formed to have a second optical waveguide tapered end 144 adjacent the optical coupler 132. The optical coupler 132 is formed to have corresponding optical coupler tapered ends 134, one of which is adjacent the first optical waveguide tapered end 138 and the other of which is adjacent the other second optical waveguide tapered end 144. The tapers discussed herein can have any useful angle with respect to the parallel planes discussed herein (or with respect to perpendicular to such parallel planes), such as 25°, 30°, 45°, 60°, 80°, etc.; and while one taper angle is shown in FIGS. 14A-14B, those ordinarily skilled in the art would understand that different angles would be used with differently spaced structures, different light wavelengths, different optic materials, etc.

The various openings described above are patterned into shapes so that the waveguide 130, the optical coupler 132, and the optical devices 140 have the shapes shown in FIGS. 14A-14B. Therefore, for example, openings 122 shown in FIG. 4 are shaped (patterned) so that the first optical waveguide tapered end 138 is shaped to direct (and receive) the optical beam from the optical waveguide 130 toward one of the optical coupler tapered ends 134 in a direction parallel to the aforementioned parallel planes, as shown in FIGS. 14A-14B. Similarly, the openings 126 shown in FIG. 8 are shaped (patterned) so that the optical coupler tapered ends 134 are shaped as shown in FIGS. 14A-14B.

Thus, the optical coupler tapered ends 134 are shaped to direct (and receive) the optical beam received from the optical waveguide 130 toward internal spaces of the optical coupler 132 (in a direction parallel to the aforementioned parallel planes, as shown by light beam path 160). Further, the optical coupler tapered ends 134 are shaped to direct (and receive) the optical beam from the internal spaces of the optical coupler 132 toward the optical waveguide 136 (in a direction parallel to the aforementioned parallel planes, as shown by light beam path 160). Correspondingly, when formed in FIG. 9, the second optical waveguide tapered end 144 is shaped to direct (and receive) the optical beam received from the optical coupler 132 toward internal spaces of the optical waveguide 136 (in a direction parallel to the aforementioned parallel planes, as shown by light beam path 160). As is understood by those ordinarily skilled in the art, reflection and refraction cause the light beam to be transmitted through such structures.

FIG. 15A is a top-view schematic diagram, FIG. 15B is a side-view schematic diagram view along line B-B in FIG. 15A, and FIG. 15C is a side-view schematic diagram view along line C-C in FIG. 15A illustrating the positioning of the waveguides 130, the optical couplers 132, and the optical waveguide 136 showing one exemplary arrangement of the devices that are discussed above.

Therefore, the optical coupler 132 can be a ring coupler (FIGS. 12-13) or a vertical adiabatic coupler (FIGS. 14A-15C). While the ring coupler is limited to a single wavelength of light, the vertical adiabatic coupler can handle a wide range of wavelengths.

Thus, the structures and methods presented above use a double BOX SOI wafer with embedded waveguides and vertical couplers to transfer optical signal to different silicon levels, which saves area on the chip and improves optical coupling between the fiber-optic cable and chip.

More specifically, the first waveguide 130 in the first SOI layer 106 does not consume any of the scarce area of the second SOI layer 110, allowing the relatively scarce area of the second SOI layer 110 to be used for electronic and optical devices. Note that the second waveguide 136 is included within the second SOI layer 110; however, the second waveguide 136 can be substantially shorter than the first waveguide 130, thereby freeing up a large amount of the area of the second SOI layer 110. For example, as shown in FIGS. 12 and 13, the second waveguide 136 can extend from the optical coupler 132 (a ring coupler in this example) for a distance that is limited to only the length of the different optical devices that are to be supplied with the optical beam from that optical coupler 132. To the contrary, the first waveguide 130 can have a much greater length (e.g., 5×, 10×, 50×, 100×, 1000×, etc.) relative to the length of the second waveguide 136, and the first waveguide 130 may run from the connection to the fiber optic cable to the optical coupler 132.

Thus, in one extreme example, the first waveguide 132 may be as long as the full width of the chip, while the second waveguide 136 may only be as long as a single optical device located on the chip. Having only the smaller second waveguides 136 on the second SOI layer 110 frees up a substantial amount of area on the second SOI layer 110. Additionally, in some examples, the first waveguide 130 may be connected to many optical couplers 132, and may supply the optical beam to multiple second waveguides 136.

Additionally, since the only devices that are positioned within the first SOI layer 106 are the optical coupler 132, the cladding areas 128, and the first optical waveguides 130; it is much easier to route the first optical waveguides 130 (because they do not need to be routed around various electrical and optical devices (140, 142, 150, 152) that will be included within the second SOI layer 110). Additionally, as shown above, the first SOI layer 106 is bounded by relatively thicker insulator layers 104, 108, which allows the first optical waveguides 130 to experience much less noise and optical loss, relative to what the first optical waveguides 130 would experience if they were located within the second SOI layer 110. Also, as shown in FIG. 11, these structure and methods provide better coupling to, and make more silicon area available to the outside fiber (allowing an easier connection to the relatively large fiber-optic cable, because such connections are spaced from the second SOI layer 110).

Figure 16:
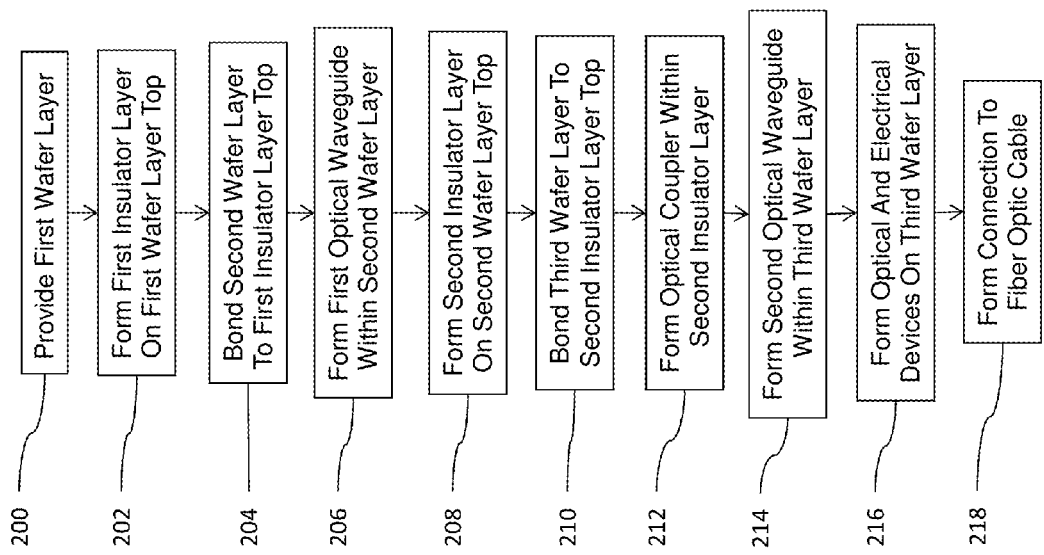
FIG. 16 is a flow diagram illustrating embodiments herein.

FIG. 16 is a flow diagram illustrating various methods herein. These exemplary methods form an integrated optical structure by first providing a first wafer layer that has a first wafer layer top in item 200. These methods then form a first insulator layer on the first wafer layer top (item 202) such that the first insulator layer bottom is directly connected to the first wafer layer top, and the first insulator layer top is opposite the first insulator layer bottom. Such methods also bond a second wafer layer to the first insulator layer top (item 204), so that the second wafer layer bottom is directly connected to the first insulator layer top and the second wafer layer top is opposite the second wafer layer bottom.

The methods then form a first optical waveguide within the second wafer layer (item 206). Also, in item 208, these methods form a second insulator layer on the second wafer layer top, so that the second insulator layer bottom is directly connected to the second wafer layer top and the second insulator layer top is opposite the second insulator layer bottom.

As shown in item 210, these methods bond a third wafer layer to the second insulator layer top such that the third wafer layer bottom is directly connected to the second insulator layer top and so that the third wafer layer top is opposite the third wafer layer bottom. Further, such methods form an optical coupler within the second insulator layer (item 212, so that (in some embodiments) the second insulator is formed to be devoid of devices other than the optical coupler. In item 214, such methods form the second optical waveguide within the third wafer layer. Furthermore, in item 216, these methods form optical and electrical devices on the third wafer layer.

The first wafer layer, first insulator layer, second wafer layer, second insulator layer and the third wafer layer, are planar layers that are formed to lie in different parallel planes. The optical coupler formed in item 210 directs the optical beam in a first direction perpendicular to the parallel planes, and the optical coupler directs the optical beam in second directions parallel to the parallel planes. Thus, the optical coupler (positioned in the second insulator layer) transmits the optical beam from the optical waveguide (that is in the second wafer layer) to the optical devices (that are on the third wafer layer) through the second insulator layer.

More specifically, the first optical waveguide is formed in item 206 to have a first optical waveguide tapered end adjacent the optical coupler, similarly the second optical waveguide is formed in item 214 to have a second optical waveguide tapered end adjacent the optical coupler, and the optical coupler is formed in item 210 to have corresponding optical coupler tapered ends adjacent the first optical waveguide tapered end and the second optical waveguide tapered end. The first optical waveguide tapered end is shaped to direct the optical beam from the optical waveguide toward the optical coupler in a direction parallel to the aforementioned parallel planes; the optical coupler tapered ends are shaped to direct the optical beam received from the optical waveguide toward internal spaces of the optical coupler in a direction parallel to the aforementioned parallel planes, and to direct the optical beam from the internal spaces of the optical coupler toward the optical device in a direction parallel to the aforementioned parallel planes; and the second optical waveguide tapered end is shaped to direct the optical beam received from the optical coupler toward internal spaces of the optical device in a direction parallel to the aforementioned parallel planes.

These methods also form a connection to a fiber-optic cable, as shown in item 218. While this connection can be formed at any step in the process, it is arbitrarily shown in FIG. 16 as item 218. The fiber-optic cable transmits the optical beam to the optical waveguide that is positioned in the second wafer layer; however, the optical device on the third wafer layer only receives the optical beam through the optical coupler, and does not directly receive the optical beam from the fiber-optic cable.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

While only one or a limited number of devices are illustrated in the drawings, those ordinarily skilled in the art would understand that many different types similar devices could be simultaneously formed with the embodiment herein and the drawings are intended to show simultaneous formation of multiple different types of such devices; however, the drawings have been simplified to only show a limited number of devices for clarity and to allow the reader to more easily recognize the different features illustrated. This is not intended to limit this disclosure because, as would be understood by those ordinarily skilled in the art, this disclosure is applicable to all such similar structures.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements).

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An integrated optical structure comprising:
a first wafer layer having a first wafer layer top;
a first insulator layer having a first insulator layer bottom directly connected to said first wafer layer top, and having a first insulator layer top opposite said first insulator layer bottom;
a second wafer layer having a second wafer layer bottom directly connected to said first insulator layer top, and having a second wafer layer top opposite said second wafer layer bottom;
a second insulator layer having a second insulator layer bottom directly connected to said second wafer layer top, and having a second insulator layer top opposite said second insulator layer bottom;
a third wafer layer having a third wafer layer bottom directly connected to said second insulator layer top, and having a third wafer layer top opposite said third wafer layer bottom;
a first optical waveguide positioned within said second wafer layer;
a second optical waveguide positioned within said third wafer layer;
an optical coupler on said first insulator layer and extending vertically through said second wafer layer so as to be positioned laterally adjacent to said first optical waveguide, through said second insulator layer, and through said third wafer layer so as to be positioned laterally adjacent to said second optical waveguide; and
insulators within said second wafer layer and said third wafer layer, said insulators separating said first optical waveguide from said optical coupler within said second wafer layer and separating said second optical waveguide from said optical coupler in said third wafer layer, said optical coupler transmitting an optical beam from said first optical waveguide to said second optical waveguide through said second insulator layer.

2. The integrated optical structure according to claim 1, said first optical waveguide comprising a first optical waveguide tapered end adjacent said optical coupler, said second optical waveguide comprising a second optical waveguide tapered end adjacent said optical coupler, said optical coupler comprising optical coupler tapered ends adjacent said first optical waveguide tapered end and said second optical waveguide tapered end, said first optical waveguide tapered end being shaped to direct said optical beam from said first optical waveguide toward said optical coupler, said optical coupler tapered ends being shaped to direct said optical beam received from said first optical waveguide toward internal spaces of said optical coupler, and to direct said optical beam from said internal spaces of said optical coupler toward said second optical waveguide, and said second optical waveguide tapered end being shaped to direct said optical beam received from said optical coupler toward internal spaces of said second optical waveguide.

3. The integrated optical structure according to claim 2, said first wafer layer, said first insulator layer, said second wafer layer, said second insulator layer, and said third wafer layer comprising planar layers lying in different, parallel planes, said optical coupler directing said optical beam in a first direction perpendicular to said parallel planes, and said optical coupler tapered ends directing said optical beam in second directions parallel to said parallel planes.

4. The integrated optical structure according to claim 1, said optical coupler comprising a ring coupler.

5. The integrated optical structure according to claim 1, said second insulator layer being devoid of devices other than said optical coupler.

6. The integrated optical structure according to claim 1, further comprising electrical devices positioned on said third wafer layer top.

7. The integrated optical structure according to claim 1, said first wafer layer being devoid of any devices, and said first wafer layer consisting of only single-crystal silicon.

8. An integrated optical structure comprising:
a first wafer layer having a first wafer layer top;
a first insulator layer having a first insulator layer bottom directly connected to said first wafer layer top, and having a first insulator layer top opposite said first insulator layer bottom;
a second wafer layer having a second wafer layer bottom directly connected to said first insulator layer top, and having a second wafer layer top opposite said second wafer layer bottom;
a second insulator layer having a second insulator layer bottom directly connected to said second wafer layer top, and having a second insulator layer top opposite said second insulator layer bottom;
a third wafer layer having a third wafer layer bottom directly connected to said second insulator layer top, and having a third wafer layer top opposite said third wafer layer bottom;
a first optical waveguide positioned within said second wafer layer;
a second optical waveguide positioned within said third wafer layer; and
an optical coupler positioned within said second wafer layer, said second insulator layer, and said third wafer layer, said optical coupler transmitting an optical beam from said first optical waveguide to said second optical waveguide through said second insulator layer, said first optical waveguide comprising a first optical waveguide tapered end adjacent said optical coupler, said second optical waveguide comprising a second optical waveguide tapered end adjacent said optical coupler, said optical coupler comprising optical coupler tapered ends adjacent said first optical waveguide tapered end and said second optical waveguide tapered end, said first optical waveguide tapered end being shaped to direct said optical beam from said first optical waveguide toward said optical coupler, said optical coupler tapered ends being shaped to direct said optical beam received from said first optical waveguide toward internal spaces of said optical coupler, and to direct said optical beam from said internal spaces of said optical coupler toward said second optical waveguide, and said second optical waveguide tapered end being shaped to direct said optical beam received from said optical coupler toward internal spaces of said second optical waveguide.

9. The integrated optical structure according to claim 8, said first wafer layer, said first insulator layer, said second wafer layer, said second insulator layer, and said third wafer layer comprising planar layers lying in different, parallel planes, said optical coupler directing said optical beam in a first direction perpendicular to said parallel planes, and said optical coupler tapered ends directing said optical beam in second directions parallel to said parallel planes.

10. The integrated optical structure according to claim 8, said optical coupler comprising a ring coupler.

11. The integrated optical structure according to claim 8, said second insulator layer being devoid of devices other than said optical coupler.

12. The integrated optical structure according to claim 8, further comprising electrical devices positioned on said third wafer layer top.

13. The integrated optical structure according to claim 8, said first wafer layer being devoid of any devices, and said first wafer layer consisting of only single-crystal silicon.

* * * * *